Oct. 18, 1949.  W. B. CONDIT ET AL  2,485,361
BROKEN TAP REMOVING
Filed Sept. 6, 1944  2 Sheets-Sheet 2
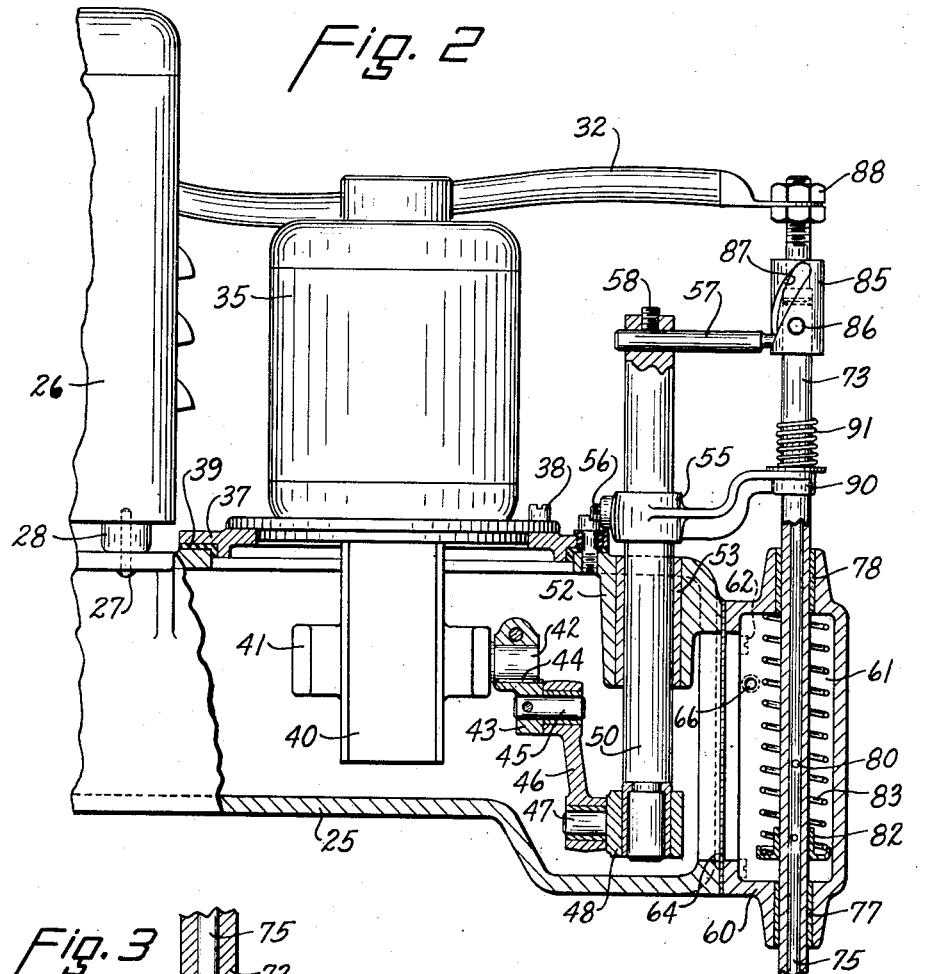
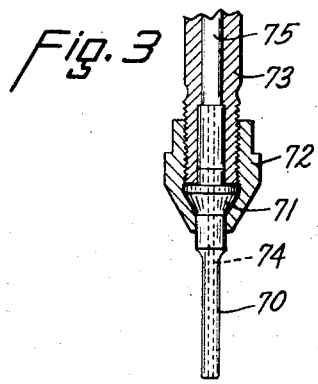

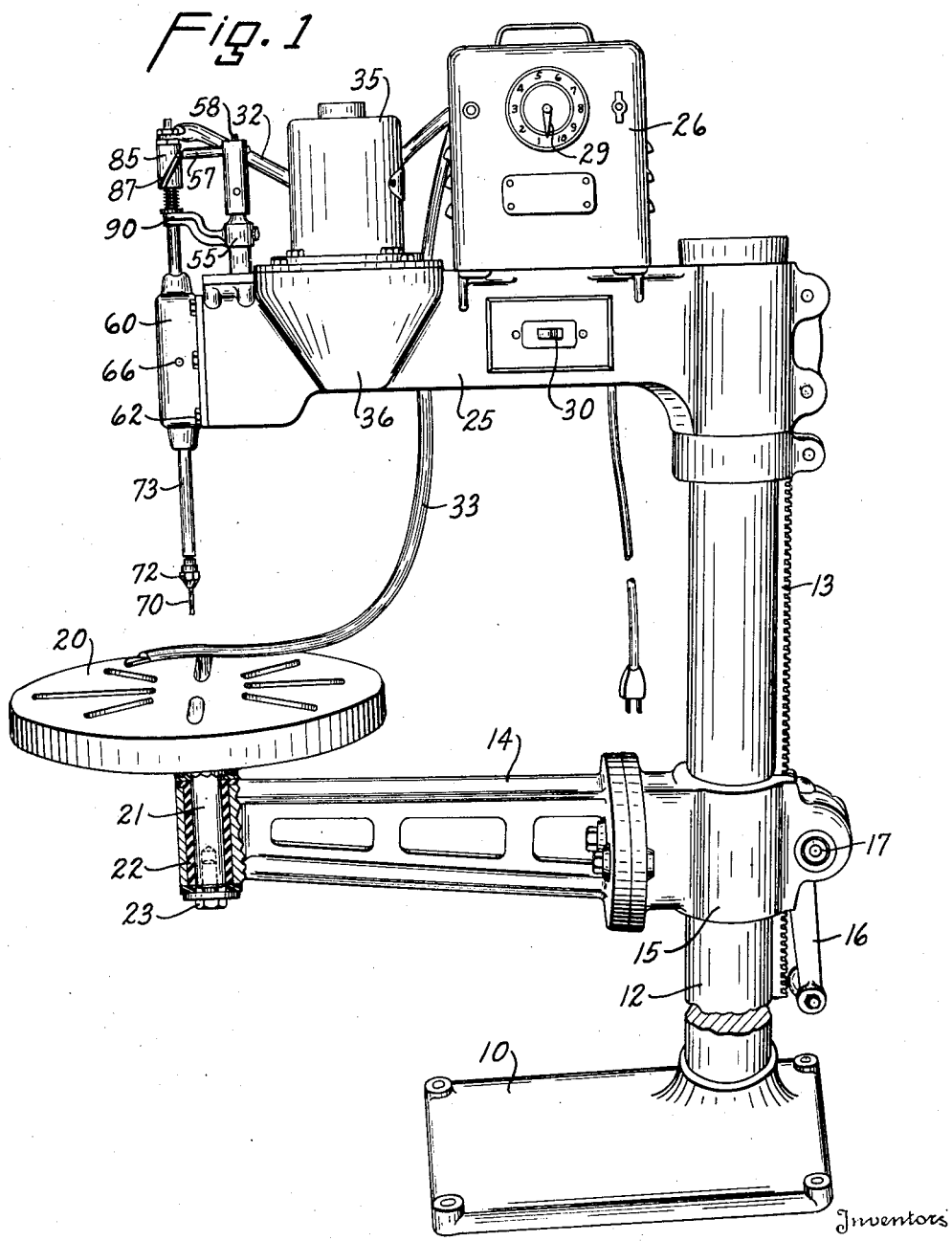

Patented Oct. 18, 1949

2,485,361

UNITED STATES PATENT OFFICE 2,485,361

BROKEN TAP REMOVING

William B. Condit, Harry E. Helfrick, and Ernest T. Poole, Springfield, Ohio, assignors to The Steel Products Engineering Company, Springfield, Ohio, a corporation of Ohio Application September 6, 1944, Serial No. 552,850

16 Claims. (Cl. 219—15)

This invention relates to the removal of elements such as broken taps and the like from work pieces.

It is a principal object of the invention to provide a simple, inexpensive and highly efficient device for removing elements such as broken taps and the like from a work piece by an electrical burning operation, the device operating automatically to follow the surface of the element as the material thereof is removed, and providing a burning action to remove the element as rapidly as possible but without objectionably heating or otherwise damaging the work piece.

It is a further object to provide such a device which may be readily controlled as to its operation to provide for periodical burning contacts alternating with periods when the elements are out of contact with each other, the control being regulated to establish the most effective and efficient conditions for safely removing the broken element as rapidly as feasible.

It is a further object to provide a novel method of electrically burning out elements such as broken taps and the like from a work piece under such conditions as to produce rapid and uniform removal of the material and without producing undue heating of or other damage to the work piece itself.

Other objects and advantages will be apparent from the following description, the accompanying drawing, and the appended claims.

In the drawing,

Fig. 1 is a perspective view of a device constructed in accordance with the present invention;

Fig. 2 is a view in side elevation of the outer end of the arm taken from the opposite side of the device from Fig. 1, and on an enlarged scale showing the operating mechanism, certain parts being broken away to more clearly show the construction; and Fig. 3 is an enlarged detailed view of the burning electrode which is brought into contact with the element to be removed.

In the manufacture of work pieces, it is frequently necessary to perform a number of different operations on a particular work piece with one of the later operations being the drilling and tapping of certain holes therein. It not infrequently happens that in the course of such drilling and tapping operations, a drill or more frequently the tap breaks off leaving a part within the work piece. To remove the broken element presents a difficult problem where it is impossible to secure sufficient gripping action thereon to back it out and remove it in the normal way, particularly where it is of small diameter, and is broken off below the surface of the work piece. In many cases it is not possible to relocate the hole in the work piece, with the result that an expensive and otherwise entirely satisfactory work piece is required to be scrapped merely on this account. It is quite obvious that this is a matter of serious importance from the standpoint of maintaining high production and avoiding unnecessary waste, becoming more acute as the work piece itself becomes more elaborate and has greater value in the particular stage of its processing at which the breakage occurs.

In accordance with the present invention it is possible to remove these broken elements rapidly and effectively by an electrical burning operation, the machine being adapted to be set in operation by manual control, and thereafter to continue without further attention until the broken element is completely burned out and removed, the surface of the broken element being followed as the burning proceeds and until it is completed with the electrode bearing against such surface with a predetermined pressure. The operation is performed under periodic conditions, providing the most advantageous cycling of time of contact between the burning electrode and the element to give the proper action. The burning action is further accelerated and promoted by the supply to the immediate vicinity of the burning zone of an oxidizing fluid, preferably a blast of air. Such air blast is conveniently introduced through a hollow electrode, performing the desirable purposes of facilitating the oxidizing action, of providing a high velocity flowing stream to facilitate physical removal of burned out particles of the element, and of carrying away excessive heat from the burning zone to thus avoid objectionable temperature rise in the body of the work piece which might produce damage thereto. Such air blast is found to be highly advantageous in providing a sweeping or cleansing action to remove burned particles of the element as they are formed.

It is found that the action is greatly accelerated and made more effective by producing relative movement between the electrode and the element to be removed, during the time that those members are in electrical contact with each other. This relative movement may conveniently be produced by rotating the electrode while in pressure contact with the element, and while the supply of oxidizing fluid is maintained. Such relative movement has been found to expedite the desired burning, increasing the rate of removal of the element very materially.

Suitable controls are also provided to enable the operator to adjust the device to provide for maintaining the electrode in pressure contact with the element for a part of the cycle during which the above described relative rotation therebetween occurs, while during another part of the cycle the parts are separated, the control means being easily adjusted by the operator to provide for varying the length of time during which each of these conditions obtains. In this way it is possible to readily adapt the device for the most efficient and effective operating conditions with different types of material, and with different sizes of elements to be removed.

Referring to the drawing which discloses a preferred embodiment of the invention, the machine is shown as comprising a base plate 10 adapted to rest upon the floor or other suitable support, and supporting an upright post 12. A rack 13 is mounted on one side of the post and provides a means for adjustably supporting an arm 14 which has a collar 15 engageable over the post, a manual crank 16 being provided on pinion shaft 17 so that in response to the adjustment of the crank, and the cooperative relation between the pinion and the rack 13, the arm will be adjusted as to its vertical position and held in such adjusted position. The arm supports a work table 20 at its outer end, the central stem 21 of this table being mounted in an insulating bushing 22 which is bolted in place by means of bolt 23, to thereby electrically insulate the table 20 from arm 14.

An upper arm 25 is supported in fixed relation at the top of post 12, and provides a mounting for an electrical transformer 26 which is fastened to the arm by means of screws 27, while being electrically insulated therefrom through the provision of insulating feet 28. The transformer may be of suitable design providing a low-voltage, high-current power source, a suitable transformer for this purpose being of the type heretofore used in electrical etching. Preferably it is provided with an adjustment 29 which may be set at a desired value to provide for varying the secondary current over such range as necessary to give the desired operating conditions. The primary or supply side of the transformer may be controlled from control switch 30 mounted on arm 25. The secondary leads from the transformer are shown at 32 and 33 respectively, lead 33 being adapted to be connected either to the table 20 or to the work piece which is supported thereon while lead 32 is connected to the movable electrode which is grounded to the upper arm.

A drive motor 35 is also mounted on arm 25, the arrangement shown incorporating a drive motor with its axis mounted vertically, a conically shaped extension 36 being formed in the arm below the motor and providing for the mounting of an adapter plate 37 to which the motor is secured by means of bolts 38. In order to insulate the motor from the arm, an insulating ring 39 is provided beneath the adapter plate 37 so that the motor is electrically insulated from the arm.

The motor carries a downwardly extending worm drive gear 40 which meshes with a worm gear 41 suitably journaled on the arm, and having a drive pin 42 extending from one end thereof. A crank arm 43 is keyed to the shaft 42 by means of key 44, and carries a drive pin 45 which has driving connection with a pitman 46, the pitman being received over pin 47 carried by a collar 48. The collar 48 is received over the lower end of a drive rod 50 which is suitably mounted in a sleeve 52 formed in the arm, a bushing 53 being provided to journal the rod 50 to permit of the reciprocation thereof with respect to the arm in response to the operation of the drive mechanism just described.

Drive rod 50 extends above arm 25 and on the upper surface thereof is provided with a bracket 55 which may be secured in adjustable position upon the rod by means of set screw 56. At its upper end the drive rod carries a horizontally extending pin 57 which is fastened in place by means of threaded screw 58.

To the forward end of arm 25 there is bolted an outer housing 60 which has a hollow interior 61 forming a fluid chamber adapted to receive a fluid under pressure. Bolts 62 detachably secure the housing in position on the outer end of the arm, and the housing is provided with a rear wall 64 which maintains the chamber 61 closed against escape of the fluid therefrom. The fluid used is preferably air pressure, which may be developed by suitable pump means incorporated in the device itself if desired, or preferably provision may be made as shown at 66 for connection of an air line to supply pressure to this chamber 61. In cases where a source of shop air pressure is available, this construction as shown is preferred because of its simplicity and cheapness.

The actual electrode is shown at 70, in the form of a suitable material having good electrical conductivity and capable of serving as the electrode to burn out the broken element without undue burning of itself, a suitable material for this purpose being a tungsten alloy material. The electrode as shown is of relatively small outside diameter, being of selected dimensions as required to fit within the hole available in the work piece, allowing a small clearance around the periphery. Different size tips 70 may be provided for removing elements of different diameter.

The tip is provided with a tapered base portion 71 which is gripped by means of a flanged nut 72 threadedly received on the lower end of conductor rod 73 so that upon the tightening of nut 72 the tip will be securely held in operative position, but is capable of ready removal and replacement. The tip is hollow, and the central passage 74 thereof is in communication with a passage 75 extending through conductor rod 73.

The conductor rod is mounted for movement in the housing member 60, being suitably guided by bushings 77 and 78 as fixed therein, leaving the rod free to move both longitudinally and rotationally. Internally of the chamber 61 the rod is provided with one or more apertures 80 which are thus in communication with the air pressure within the chamber 61, so that that pressure is continuously supplied downwardly to the hollow tip 70. The rod also carries a collar 82 which provides a seat for a compression spring 83 the upper end of which bears against the inner wall of the housing 60, thereby tending normally to depress the rod and electrode into contact with the element in the work piece with a predetermined force.

Passage 75 is closed at the upper end of rod 73 and a cylindrical cam member 85 is fastened to the rod by means of set screw 86, the cam having a spiral slot 87 in which the pin 57 is adapted to engage. Conductor 32 is electrically secured by means of nuts 88 to the upper end of the conductor rod, this side of the transformer thus being in effect connected to ground, leaving the opposite side of the transformer which is connected to the work table 20 above ground.

In order to provide for the upward travel of the conductor rod to separate the electrode from the work material periodically, bracket 55 is provided with a bifurcated end 90 fitting loosely around the rod. A spring 91 which is cammed on the end 90 of the bracket and is adapted to engage beneath the cam member 85 after a predetermined extent of upward movement of the bracket 55 under the action of the reciprocating drive rod 50. The spring action will prevent any shock and will provide for the lifting of the conductor rod and its associated electrode against the action of spring 83, smoothly and evenly and at a predetermined point in the cycle of the drive rod 50, depending upon the positioning of the bracket 55 on the drive rod, and the particular setting or location of cam 85.

The operation of the device is as follows. The work piece with the element therein which it is desired to remove is securely mounted in position on the table 20, suitable clamp means being provided which will hold the work piece firmly in place and establish proper electrical connection thereto. Switch 30 is then thrown to the on position, energizing the transformer 26 and also placing motor 35 in operation. In response to the operation of motor 35, drive rod 50 will be given a reciprocating motion which will produce the following effect. Assuming the drive rod 50 to be in its uppermost position, it will be seen that bracket 55, acting through spring 91, will engage the lower side of cam 85 to thus hold the cam and with it the conductor rod and electrode 70 in raised position against the compressing action of spring 83. As the cycle of the drive rod 50 advances, the rod will move downwardly thereby lowering the electrode until it contacts the element in the work piece, which will thereupon prevent further downward movement of the conductor rod and electrode. The rod and the electrode will continue however to remain in pressure contact with the broken element under the pressure developed by spring 83. As drive rod 50 continues its downward movement, it carries the pin 57 with it, and that pin will thus have a movement relative to cam 85, such movement in the spiral slot construction which is provided being such as to cause the rotation of the conductor rod and electrode about its longitudinal axis. Such rotary movement under a maintained pressure condition continues throughout the remainder of the downward stroke of the drive rod, and will likewise continue but in the opposite direction over the same portion of the upward stroke thereof, until such time as the rising bracket arm 90 carrying spring 91 is moved upwardly to such a point as to engage cam 85 to lift the same away from the work element. When this occurs the electrical circuit is broken, drawing an arc which contributes to the burning action. The supply of air may be continuous, so that both during the time the electrode is in contact and during the time that it is out of contact with the element, this flow of cooling and oxidizing gas continues which is found to facilitate and promote the desired burning action. The action is further materially facilitated as a result of the relative movement which takes place between the electrical contacting elements periodically during each cycle.

By suitably changing the elevation of supporting table 20 with respect to the electrode 70, and by changing the location of the bracket arm 55 on drive rod 50 and of cam 85 on conductor rod 73, the proportion of time during which the electrode is in contact with the element may be varied throughout the full range from 100% of the stroke to 0% of the stroke. As above stated, the particular operating conditions, the current density to give the most satisfactory result, spring pressures, and the portion of the cycle during which the elements are in contact may all be selected and varied as desired to give the most satisfactory and rapid operating conditions for the particular job at hand.

As a specific example, the air pressure may comprise a shop air line having a pressure of about 25 to 60 pounds per square inch, and the reciprocating action may be timed at approximately 60 R. P. M., or with a relatively short stroke of the reciprocating electrode may be increased to about 200 R. P. M. For a ⅜" tap the outside diameter of the electrode 70 may be approximately ¼", and the current used may be about 300 amperes. It is found that the rate of removal of such a tap is increased as much as five times with the use of the relatively rotating parts in the manner described herein, in comparison with the same operation where no relative movement between the electrode and the element takes place during the burning operation, a representative period required for removing such a tap one half an inch long at the higher speed of operation indicated being about 20 minutes.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. A method of removing an element such as a broken tap and the like from a work piece while leaving the work piece substantially unaffected which comprises periodically bringing a burning electrode into and out of electrical contact with substantially the entire core of the element, supplying an oxidizing fluid under pressure to the immediate vicinity of the burning zone, and concurrently producing relative movement between said electrode and said element while said electrode is in said electrical contact therewith to burn out the core of said element while avoiding objectionable heating of the adjacent wall of the work piece.

2. A method of removing an element such as a broken tap and the like from a work piece while leaving the work piece substantially unaffected which comprises periodically bringing a burning electrode into and out of electrical contact with substantially the entire core of the element, supplying an oxidizing fluid under pressure to the immediate vicinity of the burning zone, and concurrently producing relative movement in opposite directions between said electrode and said element while said electrode is in said electrical contact therewith to burn out the core of said element while avoiding objectionable heating of the adjacent wall of the work piece.

3. A device for removing elements such as broken taps and the like from a work piece which comprises a burning electrode having a diameter substantially corresponding with the body diameter of said element, means for rotating and periodically bringing said burning electrode into electrical contact with said element and separating the same to form repeating burning arcs effecting removal of substantially the entire body of said element while leaving the material of the work piece substantially unaffected, and means for concurrently supplying a flow of oxidizing fluid directly to and upon the surface of the element in contact with the electrode.

4. A device for removing elements such as broken taps and the like from a work piece while leaving the work piece substantially unaffected which comprises a burning electrode the cross section of which is substantially the same as that portion of the element to be removed which is located inwardly of the wall of said work piece, means for periodically bringing said burning electrode into electrical contact with said element, separating the same to form repeated burning arcs effecting removal of substantially the entire body of said element while leaving the material of the work piece substantially unaffected, and means for concurrently producing relative movement between said electrode and said element while said electrode is in electrical contact therewith to burn out substantially the entire body of said element while avoiding objectionable heating of the adjacent wall of the work piece.

5. A device for removing elements such as broken taps and the like from a work piece which comprises a burning electrode, means for periodically bringing said burning electrode into electrical contact with said element, separating the same to form repeated burning arcs effecting removal of substantially the entire body of said element while leaving the material of the work piece substantially unaffected, said burning electrode having a radius corresponding to that of the portion of the element to be removed which is clear of the wall of said work piece, means for maintaining a pressure on said electrode while in contact with said element, and means for rotating said electrode relative to said element while said pressure is maintained to burn out substantially the entire body of said element while avoiding objectionable heating of the adjacent wall of the work piece.

6. A device for removing elements such as broken taps and the like from a work piece which comprises a burning electrode, yieldable means tending to move said electrode into contact with the element, a reciprocating drive member, means connecting said electrode with said drive member providing for the moving thereof into contact with said element under the action of said yieldable means over a part of the stroke of said drive member, and means operable from said drive member over another part of its stroke for effecting relative rotation of said electrode and said element.

7. A device for removing elements such as broken taps and the like from a work piece which comprises a burning electrode, a reciprocating drive member, yieldable means tending to move said electrode into contact with said element, a connection between said reciprocating drive member and said electrode providing for rotation of said electrode when in contact with the work, and additional means for overcoming the action of said yieldable means to periodically move said electrode out of electrical contact with said element.

8. A device for removing elements such as broken taps and the like from a work piece which comprises a burning electrode, a reciprocating drive member, yieldable means tending to move said electrode into contact with said element, a connection between said reciprocating drive member and said electrode providing for rotation of said electrode when in contact with the work, and adjustable means carried by said drive member and engageable with said electrode, said member being adjustable to vary the proportion of the stroke during which the electrode remains in contact with the element.

9. A device for removing elements such as broken taps or the like from a work piece which comprises a supporting arm, drive means mounted on said arm including a reciprocating driving member, a burning electrode, a hollow tube for supporting said electrode from said arm for rotational and longitudinal adjustment therein, means for supplying a flow of air to said hollow tube to be delivered immediately to the burning zone, and adjustable driving connections between said drive member and said tube to cause the periodic movement of said electrode into contact with said element and withdrawal therefrom.

10. A device for removing elements such as broken taps and the like from a work piece which comprises a supporting arm, a housing supported on said arm and having an air chamber therein, a burning electrode, a hollow tube for supporting said electrode for reciprocating movement, bearing means carried by said chamber for supporting said tube for rotary and longitudinal movement, said tube having an air supply passage connecting said air chamber to said electrode providing for the supply of fluid to said electrode for delivery thereby immediately to the burning zone.

11. A method of removing an element such as a broken tap and the like from a work piece while leaving the workpiece substantially unaffected which comprises periodically bringing a burning electrode into electrical contact with the element over substantially the entire radius of said element and closely approaching but spaced from the wall of said work piece, supplying an oxidizing fluid under pressure to the immediate vicinity of the burning zone, and rotating said electrode relative to said element while said electrode is in electrical contact therewith to burn out substantially the entire body of said element while avoiding objectionable heating of the adjacent wall of the work piece.

12. A method of removing an element such as a broken tap and the like from a work piece while leaving the work piece substantially unaffected which comprises periodically bringing a burning electrode into electrical contact with the element over substantially the entire radius of said element and closely approaching but spaced from the wall of said work piece, supplying an oxidizing fluid under pressure to the immediate vicinity of the burning zone, maintaining a pressure on said electrode while in contact with said element, and rotating said electrode relative to said element while said pressure is maintained to burn out substantially the entire body of said element while avoiding objectionable heating of the adjacent wall of the work piece.

13. A method of removing an element such as a broken tap and the like from a work piece while leaving the work piece substantially unaffected which comprises periodically bringing a burning electrode into electrical contact with the element over substantially the entire radius of said element and closely approaching but spaced from the wall of said work piece, supplying an oxidizing fluid under pressure to the immediate vicinity of the burning zone, maintaining a pressure on said electrode while on contact with said element, and rotating said electrode in opposite directions relative to said element while said pressure is maintained to burn out substantially the entire body of said element while avoiding objectionable heating of the adjacent wall of the work piece.

14. A device for removing elements such as broken taps and the like from a work piece while leaving the work piece substantially unaffected which comprises a burning electrode, means for periodically bringing said burning electrode into electrical contact with said element, said burning electrode having a radius substantially corresponding to that of the portion of element to be removed which is clear of the wall of said work piece, means for supplying an oxidizing fluid under pressure to the immediate vicinity of the burning zone, and means for rotating said electrode relative to said element while said electrode is in electrical contact therewith to burn out substantially the entire body of said element while avoiding objectionable heating of the adjacent wall of the work piece.

15. In apparatus for removing metal from a metallic structure by a burning action, an electrode formed from material highly resistant to the action of an electric arc, means guiding said electrode for to-and-fro movement substantially in a straight-line direction, whereby the electrode tip is moved into and out of engagement with the metal to be burned, means for imparting such to-and-fro movement to said electrode and for feeding the electrode into said metal as it is burned, and means for imparting a step of rotatable movement to said electrode each time that it is moved into engagement with the metal to be burned, said apparatus being adapted to have associated therewith means for intermittently establishing an electric arc between said electrode tip and the metal to be burned.

16. In apparatus for removing by a burning action a broken tool imbedded in a passage extending into a structure, an electrode formed from material highly resistant to the action of an electric arc, means for imparting to-and-fro and feeding movement substantially in a straight-line direction to said electrode whereby the electrode tip is moved into and out of engagement with the tool to be burned, means guiding said electrode for such to-and-fro movement along a path spaced from the interior surface defining said passageway whereby the electrode remains spaced at all times from said interior surface, and means for imparting a step of rotatable movement to said electrode each time that it is moved into engagement with the metal to be burned, said apparatus being adapted to have associated therewith means for intermittently establishing an electric arc between said electrode tip and the tool to be burned.

WILLIAM B. CONDIT.
HARRY E. HELFRICK.
ERNEST T. POOLE.

REFERENCES CITED

The following references are of record in the file of this patent:

UNITED STATES PATENTS

| Number | Name | Date |
| --- | --- | --- |
| 650,124 | Coleman | May 22, 1900 |
| 1,242,171 | Geisenhoner | Oct. 9, 1917 |
| 1,318,147 | Herrick | Oct. 7, 1919 |
| 1,324,337 | Chapman et al. | Dec. 9, 1919 |
| 1,572,515 | Clawson | Feb. 9, 1926 |
| 1,620,519 | Clawson | Mar. 8, 1927 |
| 2,066,588 | Taylor | Jan. 5, 1937 |
| 2,079,310 | Bennett | May 4, 1937 |
| 2,383,382 | Harding | Aug. 21, 1945 |
| 2,383,383 | Harding | Aug. 21, 1945 |
| 2,385,665 | Warwick | Sept. 25, 1945 |

FOREIGN PATENTS

| Number | Country | Date |
| --- | --- | --- |
| 22,934 | Denmark | Mar. 13, 1918 |